United States Patent
Challener et al.

(10) Patent No.: US 6,598,032 B1
(45) Date of Patent: Jul. 22, 2003

(54) SYSTEMS AND METHOD FOR HIDING FROM A COMPUTER SYSTEM ENTRY OF A PERSONAL IDENTIFICATION NUMBER (PIN) TO A SMART CARD

(75) Inventors: David Carroll Challener, Raleigh, NC (US); Joseph McGovern, Apex, NC (US); Hernando Ovies, Cary, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/523,490

(22) Filed: Mar. 10, 2000

(51) Int. Cl.$^7$ ................................. G06F 17/60
(52) U.S. Cl. ..................... 705/72; 705/64; 705/73; 705/75
(58) Field of Search ...................... 705/64–79

(56) References Cited

U.S. PATENT DOCUMENTS

| | | | |
|---|---|---|---|
| 4,722,054 A | * 1/1988 | Yorozu et al. | 364/401 |
| 5,815,577 A | 9/1998 | Clark | |
| 5,835,791 A | 11/1998 | Goff et al. | |
| 5,841,424 A | 11/1998 | Kikinis | |
| 5,935,244 A | 8/1999 | Swamy et al. | |
| 6,385,729 B1 | * 5/2002 | DiGiorgio et al. | 713/201 |

FOREIGN PATENT DOCUMENTS

WO    WO 96/18169    * 6/1996    ............ G06K/9/00

OTHER PUBLICATIONS http://www.cardpayment.com/products/verifone/pp101, "PINpad 101".*

Spectra Technologies, "S9000 Series Point of Sales (POS) Terminal".* http://www.cardpayment.com/products/verifone/pp101, "PINpad 101".*

\* cited by examiner

*Primary Examiner*—James P. Trammell
*Assistant Examiner*—Jalatee Worjloh
(74) *Attorney, Agent, or Firm*—J. Bruce Schelkopf; Bracewell & Patterson LLP (57) ABSTRACT

A system and method for isolating a computer system from entry of a personal identification number (PIN) to a smart card. The system and method includes a computer system that is in communication with an unsecure network to allow a user to engage in a purchase transaction. The system and method also includes a smart card reader in which a smart card is inserted and read. A secure personal-identification-number (PIN) entry device is coupled between the computer system and the smart card reader. The secure PIN entry device is used for entering a correct code for the PIN. Communication between computer system and secure PIN entry device is disconnected until the correct code for the PIN is entered at secure PIN entry device and sent to the smart card in order to authorize use of the smart card for the purchase transaction. In response to the correct code for the PIN being entered and sent to the smart card, communication between computer system and secure PIN entry device is established. The secure PIN entry device has a processor for controlling the disconnection and connection of communication between the computer system and the secure PIN entry device. The secure PIN entry device also has a display for displaying a message request relating to the purchase transaction. The message request prompts a user to provide the PIN to authorize use of the smart card for a purchase transaction.

20 Claims, 4 Drawing Sheets

SYSTEMS AND METHOD FOR HIDING FROM A COMPUTER SYSTEM ENTRY OF A PERSONAL IDENTIFICATION NUMBER (PIN) TO A SMART CARD

BACKGROUND OF THE INVENTION

1. Technical Field

The present invention relates in general to communications between data processing systems and peripheral devices, and in particular to a system and method for hiding from a computer system entry of a personal identification number (PIN) to a smart card when the PIN is being entered to authorize a purchase transaction for charging a purchase to the smart card. Still more particularly, the present invention relates to a system and method for further securing the use of a smart card that requires entry of a PIN from hackers.

2. Description of the Related Art

The proliferation of computers that provide Universal Serial Bus (USB) ports has resulted in the creation and use of various peripheral devices that interface to computers via the USB and will hereafter be referred to as USB devices. The use of such USB devices is very attractive due to the low cost of implementing USB technology.

USB devices that presently exist include authorization devices, authentication devices, secure devices, etc. (hereinafter collectively referred to as "security devices"). One well known example of such a security device is a smart card reader that reads a smart card. With reference now to the figures and in particular with reference to FIG. 1, a block diagram 100 illustrating a smart card reader 108 in communication with a computer system 102 via a USB communications line 106 according to the prior art is shown. As shown, smart card reader 108 has a smart card reader slot 110 in which a smart card 112 is inserted to be read. Smart card reader 108 may be easily connected to computer system 102 in a "Plug-and-Play" manner. The use of smart card reader 108 with computer system 102 is very attractive due to the low cost and ease of set up.

Figure 1:
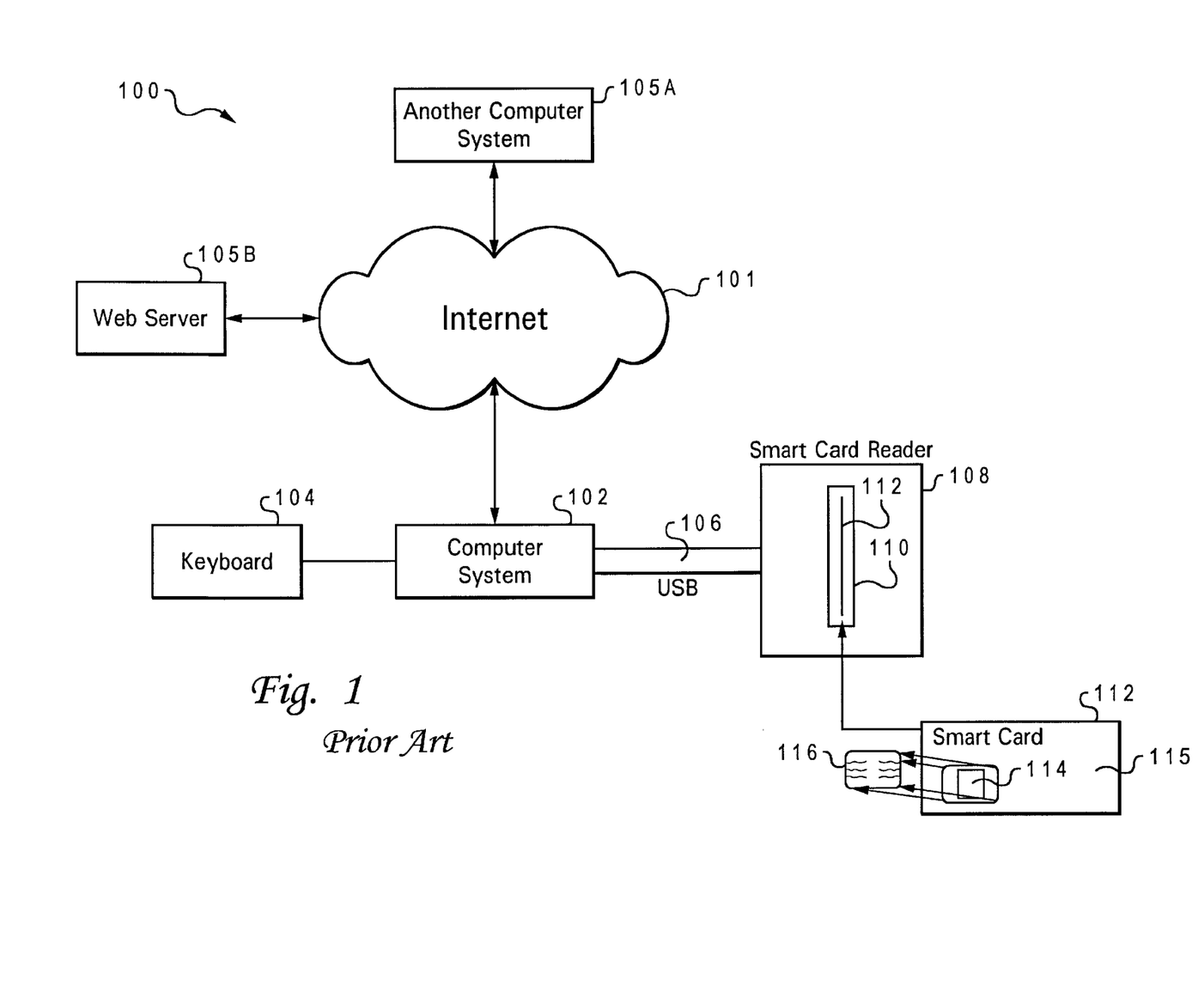
FIG. 1 is an exemplary block diagram illustrating a conventional configuration of a computer system in communication with a smart card in accordance with the prior art.

FIG. 1 further shows (in an exploded view) that smart card 112 has an electronic chip 114 embedded in a card body 115 of smart card 112. Smart card 112 further has module contacts 116 that overlie and are in contact with electronic chip 114. Module contacts 116 contact electronic contacts in smart card reader 108 and interface with smart card reader 108 when smart card 112 is inserted into slot 112 and read by smart card reader 108. Electronic chip 114 generally has a microprocessor and a memory system, that includes at least a write-only memory device and an internal read-only memory (ROM) device. Smart card reader 108 generally serves as an electronic interface device between smart card 112 and computer system 102.

A user uses computer system 102 to browse a product or service provider's web site at web server 105B via Internet 101. Computer system 102 may be either in a typical residential or commercial setting. When the user enters into a purchase transaction with the product or service provider hosting web server 105B in order to purchase a product(s) or service(s) offered at the web site, web server 105B is programmed to send to computer system 102 a payment method request to prompt the user to provide a payment method for satisfying the charge(s) of the purchase transaction. The user indicates to computer system 102 that smart card 112 is to be used as the charge card to be charged for the purchase transaction. The user inserts smart card 112 into smart card reader 108. A message request is generated by web server 105B, and the message request generally involves an inquiry by the product or service provider to the user to verify the purchase(s) and the respective amount(s) to be charged to smart card 112 and to prompt entry of the correct PIN for smart card 112.

When smart card 112 is set up as a charge card used by a card holder only (i.e., user), the correct personal identification number (PIN) is assigned as an authorization code for smart card 112 and stored in the internal ROM device within electronic chip 114 of smart card 112. The internal ROM device is only able to be read internally by the microprocessor of smart card 112 and not by any other device, particularly external devices. The PIN is memorized by the user and provided to smart card 112 by the user when the user wishes to charge a purchase(s) to smart card 112.

As shown in FIG. 1, when smart card 112 is inserted into slot 110 of smart card reader 108, electronic chip 114 of smart card 112 is then in contact with smart card reader 108 via module contacts 116 and electronic contacts of smart card reader 108. Computer system 102 is programmed to sense insertion of smart card 112 into smart card reader 108 via USB communication line 106. Identity of smart card 112 is stored in a memory device of electronic chip 114 and is sent to computer system 102 and web server 105B in order to respectively identify smart card 112 as the card to be charged for a purchase(s) made in the purchase transaction. No other numbers or card information (i.e. credit or debit card numbers or expiration dates) are associated with smart card 112 in order to use smart card 112 as a charge card.

The message request prompts the user to enter the correct PIN (e.g., a four or five digit code) for authorizing use of smart card 112. The user then attempts entry of the PIN through keyboard 104, and the entered PIN is sent to computer system 102, which, in turn, sends the entered PIN to smart card 112 via USB communication line 106 and smart card reader 108. The entered PIN is received by electronic chip 114 of smart card 112. Electronic chip 114 directs storage of the entered PIN into the write-only memory device. The entry of the PIN is generally a one-time entry to smart card 112, and the entered PIN is used only one time per entry for authorizing smart card 112. The entered PIN may be programmed to be erased after authorization or after a pre-determined amount of time has elapsed.

The microprocessor in electronic chip 114 compares the entered PIN stored in the write-only memory device with the correct PIN stored in the ROM device (i.e., PIN comparison is performed). If the entered PIN in the write-only memory device matches the correct PIN stored in the ROM device, then an authorization signal for authorizing the purchase transaction and allowing the purchase(s) from the purchase transaction to be charged to smart card 112 is generated by smart card 112. The authorization signal does not contain any PIN information. The authorization signal is sent from smart card 112 to computer system 102 via smart card reader 108 and USB communication line 106 and then to web server 105B via Internet 101. Web server 105B accordingly acknowledges authorization of the purchase transaction and respectively charges smart card 112 for the purchase(s) from the purchase transaction. On the other hand, if the entered PIN in the write-only memory device does not match the correct PIN stored in the ROM device, then a decline signal for declining the purchase transaction and prohibiting the purchase(s) from the purchase transaction to be charged to smart card 112 is generated by smart card 112. The decline signal is sent from smart card 112 to computer system 102 via smart card reader 108 and USB communication line 106 and then to web server 105B via Internet 101. Computer system 102 may be directed to prompt the user to re-attempt entry of the correct PIN, and the process of verifying the correct PIN for smart card 112 is again repeated for the re-entered PIN. After a number of attempts to enter the PIN have been tried, computer system 102 may be programmed to finally prevent the user from making any further attempts to enter the correct PIN.

Since the identity of smart card 112 is sent to computer system 102 by smart card 112 and the PIN is entered by the user into computer system 102 through keyboard 104, an unauthorized person using another computer system 105A may be able to gain illicit access into computer system 102 and learn the identity of smart card 112 and the PIN for smart card 112 when the PIN is being entered into computer system 102. For example, when computer system 102 is in on-line communications with web server 105B via Internet 101, the unauthorized person can use computer system 105A to gain illicit access into computer system 102 through Internet 101. The unauthorized person could use a program, such as a "Trojan Horse" program or a "Back Orifice" program, from computer system 105A that would enable every input and entry being made to computer system 102 to be viewed at computer system 105A. The unauthorized person would be able to learn the identity of smart card 112 and the user's PIN by respectively gaining access and watching on a display screen at computer system 105A the information transmitted from smart card 112 to computer system 102 and key strokes being depressed on keyboard 104 of computer system 102 when the user is entering the PIN for smart card 112. With the unauthorized person knowing the identity and the correct PIN of smart card 112, the unauthorized person would be able to configure a duplicate smart card with the same identity and the correct PIN and use the duplicate smart card to make unauthorized purchases. This situation poses a serious security problem with user's being able to use smart cards 112 as a charge card.

Due to the existence of such serious security problems, smart cards 112 are generally not compliant with standards for credit cards, debit cards, or other secure transaction cards (hereinafter collectively referred to as "secure transaction cards"). An example of such standards is provided by the Euro Card/Master Card/Visa Card (EMV) standards. The fact that smart cards 112 are not compliant with these security standards is quite unfortunate since the use of smart card 112 would provide an inexpensive and easy way for implementing a charge card for authorizing purchase transactions for charging purchases to smart card 112, particularly for purchase transactions made over Internet 101.

SUMMARY OF THE INVENTION

A system and method for isolating a computer system from entry of a personal identification number (PIN) to a smart card. The system and method includes a computer system that is in communication with an unsecure network to allow a user to engage in a purchase transaction. The system and method also includes a smart card reader in which a smart card is inserted and read. A secure personal-identification-number (PIN) entry device is coupled between the computer system and the smart card reader. The secure PIN entry device is used for entering a correct code for the PIN. Communication between computer system and secure PIN entry device is disconnected until the correct code for the PIN is entered at secure PIN entry device and sent to the smart card in order to authorize use of the smart card for the purchase transaction. In response to the correct code for the PIN being entered and sent to the smart card, communication between computer system and secure PIN entry device is established. The secure PIN entry device has a processor for controlling the disconnection and connection of communication between the computer system and the secure PIN entry device. The secure PIN entry device also has a display for displaying a message request relating to the purchase transaction. The message request prompts a user to provide the PIN to authorize use of the smart card for a purchase transaction.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention secures sending of a personal identification number (PIN) to a smart card which is inserted into and read by a smart card reader. The smart card reader is in communication with a computer system that may be in communication with an unsecure network, such as the Internet. The present invention thereby overcomes the security problems associated with smart cards and smart card readers interfaced to computer systems that are in communication with an unsecure network. The present invention further enables smart cards and smart card readers to comply with standards for secure transaction cards, such as the Euro Card/Master Card/Visa Card (EMV) standard. The present invention couples a secure personal identification number (PIN) entry device between a computer system and a smart card reader that reads a smart card. Communication to the computer system is disconnected when the PIN is being entered and sent to the smart card and is connected after the PIN has been sent to and processed by the smart card. The basic configuration of the present invention prevents the PIN from being accessed in any way by the computer system when the PIN is being entered at the secure PIN entry device.

Figure 2:
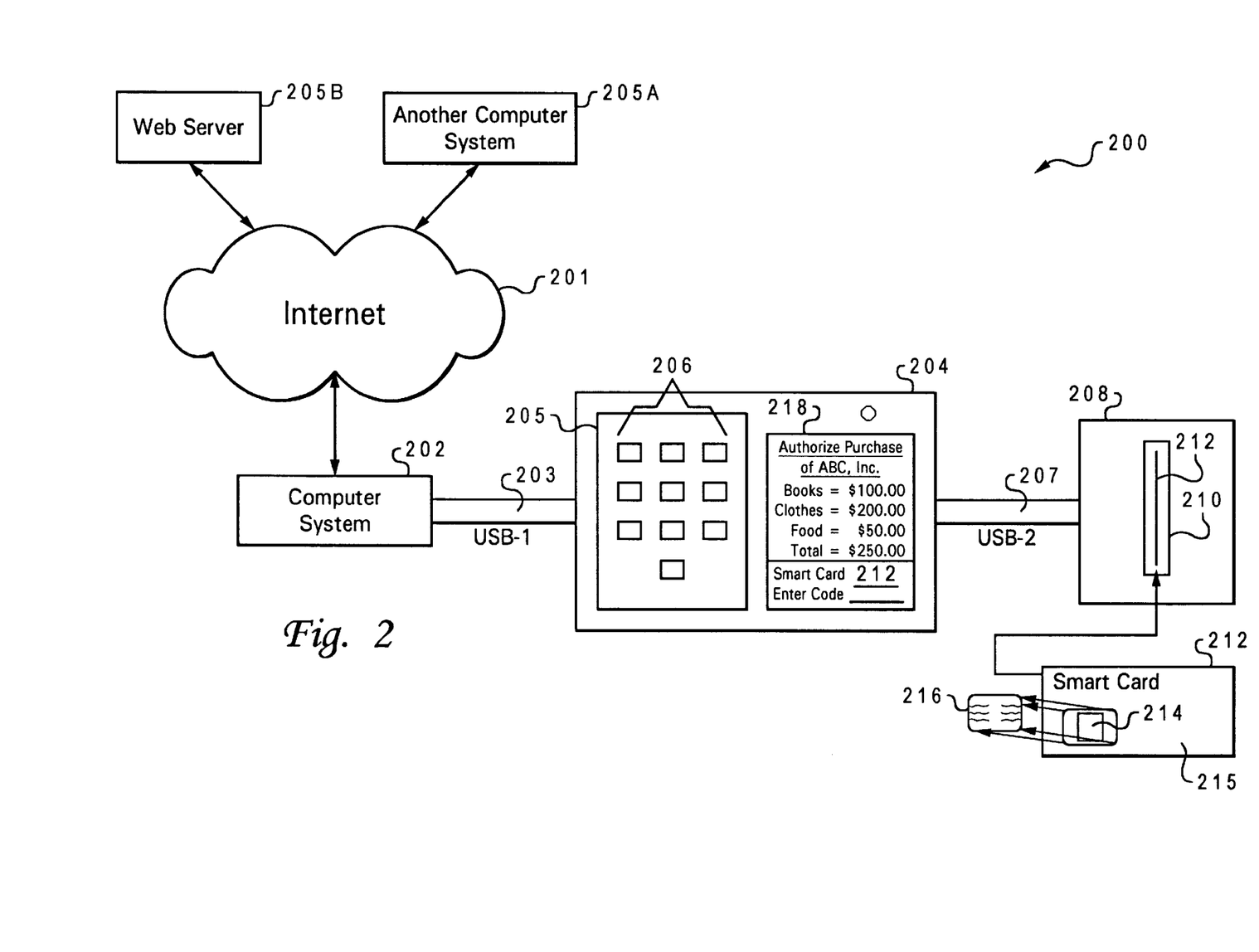
FIG. 2 is a block diagram illustrating a secure personal identification number (PIN) entry device coupled between a computer system and a smart card in accordance with the present invention.

With reference now to FIG. 2, a block diagram 200 illustrating secure PIN entry device 204 coupled between computer system 202 and smart card reader 208, which is reading smart card 212, in accordance with the present invention is shown. Secure PIN entry device 204 is in communication with computer system 202 via USB communication line 203, and secure PIN entry device 204 is also in communication with smart card reader 208 via USB communication line 207. As shown, smart card reader 208 has a smart card reader slot 210 in which a smart card 212 is inserted to be read. Smart card reader 208 may be easily connected to computer system 202 in a "Plug-and-Play" manner. The use of smart card reader 208 with computer system 202 is very attractive due to the low cost and ease of set up. Computer system 202 may be in communication with web server 205B via an unsecure network, such as Internet 201. Another computer system 205A may also be in communication with Internet 201. The configuration in block diagram 200 may be either in a residential or commercial setting.

FIG. 2 further shows that smart card 212 has an electronic chip 214 embedded in a card body 215 of smart card 212. Smart card 212 further has module contacts 216 that overlie and are in contact with electronic chip 214. Module contacts 216 contact electronic contacts (not shown) inside smart card reader 208 and interface with smart card reader 208 when smart card 212 is inserted into slot 212 and read by smart card reader 208. Electronic chip 214 generally contains at least a microprocessor and a memory system, that includes a write only memory device and an internal read only memory (ROM) device. Smart card reader 208 generally acts as an electronic interface device between smart card 212 and computer system 202.

Also, FIG. 2 shows that secure PIN entry device 204 has a key pad 205 having entry keys 206. Entry keys 206 of key pad 205 are used by the user to enter the PIN for smart card 212. Secure PIN entry device 204 further has a display 218 for displaying a message request from computer system 202 for authorizing a purchase transaction and charging a purchase(s) made in the purchase transaction to smart card 212.

Smart card 212 is set up as a charge card by assigning a correct personal identification number (PIN) as an authorization code for smart card 212. The correct PIN is stored in the internal ROM device within electronic chip 214 of smart card 212. Internal ROM device is only able to be read internally by the microprocessor of smart card 212 and not able to be read by any other device, particularly external devices. The PIN is memorized by the user and provided to smart card 212 by the user when the user wishes and is prompted by the programmed chip of secure PIN entry device 204 to authorize a purchase transaction for charging a purchase(s) to smart card 212.

In operation, a user uses computer system 202 to browse a product or service provider's web site at web server 205B via Internet 201. When the user enters into a purchase transaction with the product or service provider hosting web server 205B in order to purchase a product(s) or service(s) offered at the web site, web server 205B is programmed to send to computer system 202 a payment method request to prompt the user to provide a payment method for satisfying the charge(s) for a purchase(s) for the purchase transaction. In the present case, the user indicates to computer system 202 that smart card 212 is to be used as the charge card to be charged for the purchase transaction, for example, by inserting smart card 212 into smart card reader 208. A message request is then generated by web server 205B, and the message request generally involves an inquiry by the product or service provider verifying the purchase(s) and the respective amount(s) to be charged to smart card 212 from the purchase transaction. Computer system 202 sends the message request to secure PIN entry device 204, and secure PIN entry device 204 shows the message request on display 218. For example, FIG. 2 shows that the message request on display 218 may include to whom the charge is being made (e.g., product or service provider, ABC, Inc.), for what purchase(s) (e.g., books, clothes, food, etc.), for what respective amount(s) (e.g., $100.00, $200.00, $50.00, etc.), a total amount being charged (e.g., $350.00), the identity of smart card 212 to be charged, and a request for the PIN of smart card 212.

Once the message request is displayed on display 218, secure PIN entry device 204 is immediately disconnected from computer system 202 (i.e., computer system 202 is isolated from secure PIN entry device 204) until a verified authorization for the purchase transaction is received by secure PIN entry device 204 from smart card 212. Disconnection of secure PIN entry device 204 from computer system 202 may be accomplished in various ways.

One way of accomplishing such disconnection is to have a programmed chip located in secure PIN entry device 204 that electronically or logically disconnects communication with computer system 202 along USB communication line 203 until a signed or verified authorization for the purchase transaction is received by the programmed chip from smart card 212. Electronic disconnection involves having the programmed chip switch off-line secure PIN entry device 204 from computer system 202 such that no communication exists between computer system 202 and secure PIN entry device 204/smart card reader 208. Logical disconnection also involves switching off communication between actual secure PIN entry device 204/actual smart card reader 208 with computer system 202 but further involves programming the programmed chip in secure PIN entry device 204 to simulate an activated secure PIN entry device 204 and an activated smart card reader 208 that are communicated to computer system 202. The simulated activation leads computer system 202 to recognize that these devices in fact exist.

By disconnecting electronic communication between these devices, computer system 202 is unable to acknowledge existence of secure PIN entry device 204 or smart card reader 208. In the case of electronic disconnection, computer system 202 may search and cause a new device discovery cycle to be performed for finding secure PIN entry device 204 and smart card reader 208 until a signed or verified authorization for purchase transaction is sent from smart card 212 being read by smart card reader 208 to the programmed chip at secure PIN entry device 204. In the case of logical disconnection, such a search and new device discover cycle is avoided since existence of secure PIN entry device 204 and smart card reader 208 are simulated. A hacker that uses another computer system 205A to hack into computer system 202 via Internet 201 would be prevented from obtaining the PIN being entered at secure PIN entry device 204 and the identity of smart card 212 during the time that the PIN is being entered since computer system 202 is electronically or logically disconnected from secure entry PIN device 204 and smart card reader 208.

The message request shown on display 218 by the programmed chip of secure PIN entry device 204 prompts the user to enter the PIN (i.e., a four or five digit code) of smart card 212 into secure PIN entry device 204 to authorize the purchase transaction and charge the charge(s) from the purchase transaction to smart card 212. The user then attempts entry of the PIN using entry keys 206 on key pad 205 of secure PIN entry device 204. The entered PIN is sent directly to smart card 212 via USB communication line 207 and smart card reader 208. The entered PIN is received by electronic chip 214 of smart card 212. Electronic chip 214 directs the storing of the entered PIN into the write only memory device. The entry of the PIN is generally a one-time entry to smart card 212, and the entered PIN is used only one time per entry for authorizing smart card 212. The entered PIN may be programmed to be erased after authorization or after a pre-determined amount of time has elapsed.

The microprocessor in electronic chip 214 of smart card 212 compares the entered PIN stored in the write-only memory device with the correct PIN stored in the ROM device (i.e., PIN comparison performed). If the entered PIN in the write-only memory device matches the correct PIN stored in the ROM device, then an authorization signal authorizing the purchase transaction and allowing the purchase(s) from the purchase transaction to be charged to card 212 is generated by smart card 212. The authorization signal does not contain any PIN information. The authorization signal is sent from smart card 212 to secure PIN entry device 204. In response to receiving the authorization signal for the purchase transaction, the programmed chip establishes connection between secure PIN entry device 204 and computer system 202. The authorization signal for the purchase transaction is then sent to computer system 202 via smart card reader 208, USB communication line 207, secure PIN entry device 204, and USB communication line 203 and then to web server 205B via Internet 201. Web server 205B accordingly acknowledges the authorization of the purchase transaction and charges smart card 212 for the purchase(s) from the purchase transaction.

On the other hand, if the entered PIN in the write-only memory device does not match the correct PIN stored in the ROM device, then a decline signal for declining the purchase transaction and prohibiting the purchase(s) from being charged to smart card 212 is generated by smart card 212. The decline signal is sent from smart card 212 to secure PIN entry device 204 via smart card reader 208 and USB communication line 207. The programmed chip of secure PIN entry device 204 may be programmed to prompt the user to re-enter the PIN at secure PIN entry device 204, and the process of verifying the correct PIN for smart card 212 is again repeated for the re-entered PIN. After a number of attempts of entry of the PIN, the programmed chip of secure PIN entry device 204 may be programmed to finally deny the user from making the purchase. During this entire time that the correct PIN is not entered and the purchase transaction is declined, secure PIN entry device 204 is maintained as disconnected from computer system 202.

Figure 3:
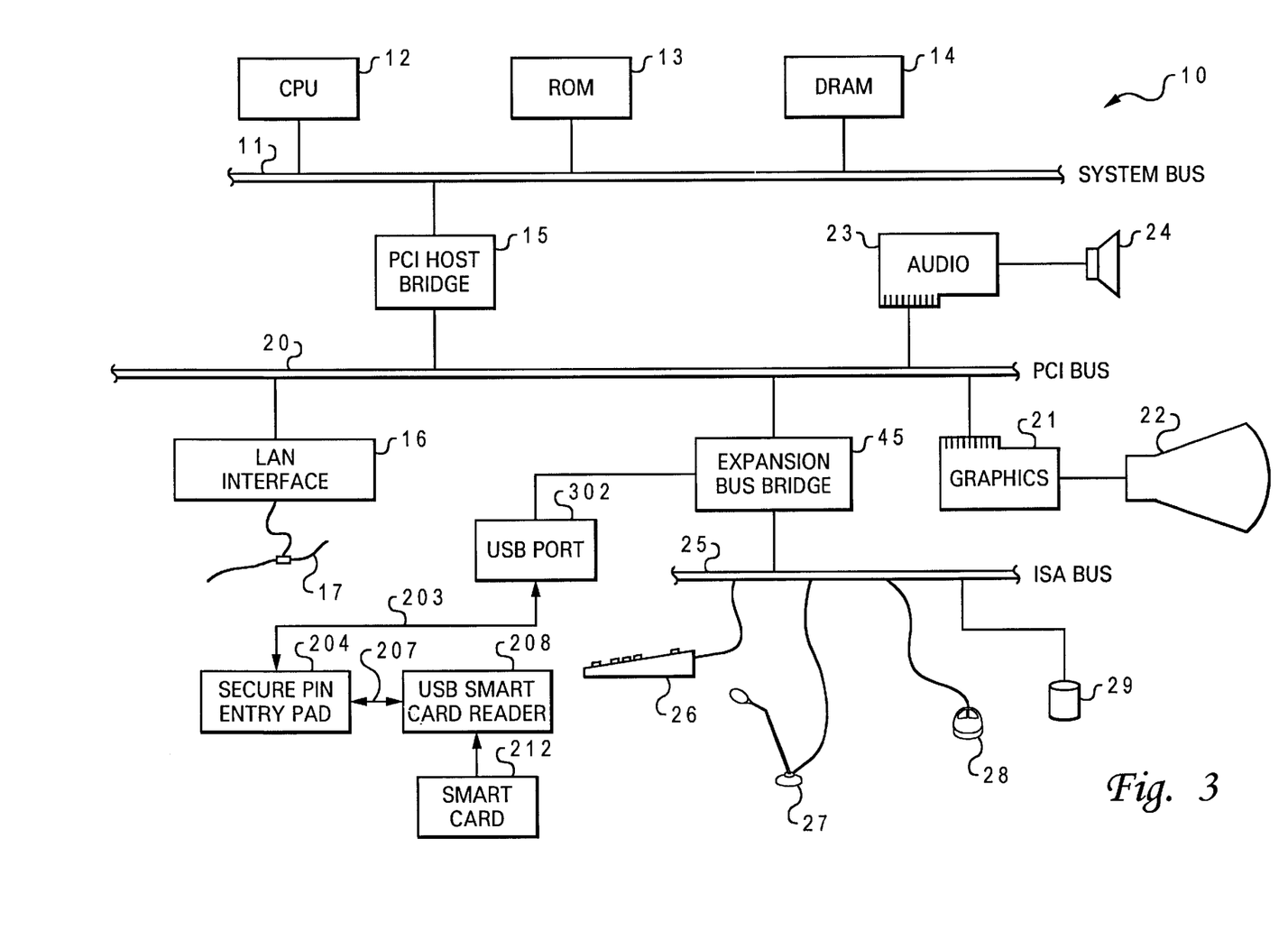
FIG. 3 is a block diagram of an exemplary embodiment of a computer system that may be used by the present invention.

Referring now to FIG. 3, there is a diagram of a typical computer system 10, that may be the computer system 202, used for the present invention. As shown, a central processing unit (CPU) 12, read only memory (ROM) 13, and a Dynamic Random Access Memory (DRAM) 14 are connected to a system bus 11 of computer system 10. CPU 12, ROM 13, and DRAM 14 are also coupled to a PCI local bus 20 of computer system 10 through a PCI host bridge 15. PCI host bridge 15 provides a low latency path through which processor 12 may directly access PCI devices mapped anywhere within bus memory and/or I/O address spaces. PCI host bridge 15 also provides a high bandwidth path allowing PCI devices to directly access DRAM 14. In addition, an audio adapter 23 may be attached to PCI local bus 20 for controlling audio output through speaker 24. A graphics adapter 21 may be attached to PCI local bus 20 for controlling visual output through display monitor 22. Also attached to PCI local bus 20 is a local-area-network (LAN) interface adapter 16. LAN interface adapter 16 is for connecting computer system 10 to a local-area network (LAN) 17. A PCI-to-ISA bus bridge, such as an expansion bus bridge 45, may be utilized for coupling an ISA bus 25 to PCI local bus 20. As shown, a keyboard 26, a microphone 27, a mouse 28, and a hard disk drive 29 may be attached to ISA bus 25 for performing certain basic I/O functions. Also, USB port 302 is coupled to expansion bus bridge 45. Secure PIN entry device 204 is coupled to USB port 302 to communicate with computer system 10 via USB communication line 203. Secure PIN entry device 204 is also coupled in communication to smart card reader 208 via USB communications line 207. As shown, smart card 212 is inserted into and read by smart card reader 208. Although the illustrated exemplary embodiment describes a PCI local bus 20, an ISA bus 25, and an USB, the present invention is not limited to these particular bus architectures. Rather, the present invention can be utilized in any bus system having other different bus architectures.

Figure 4:
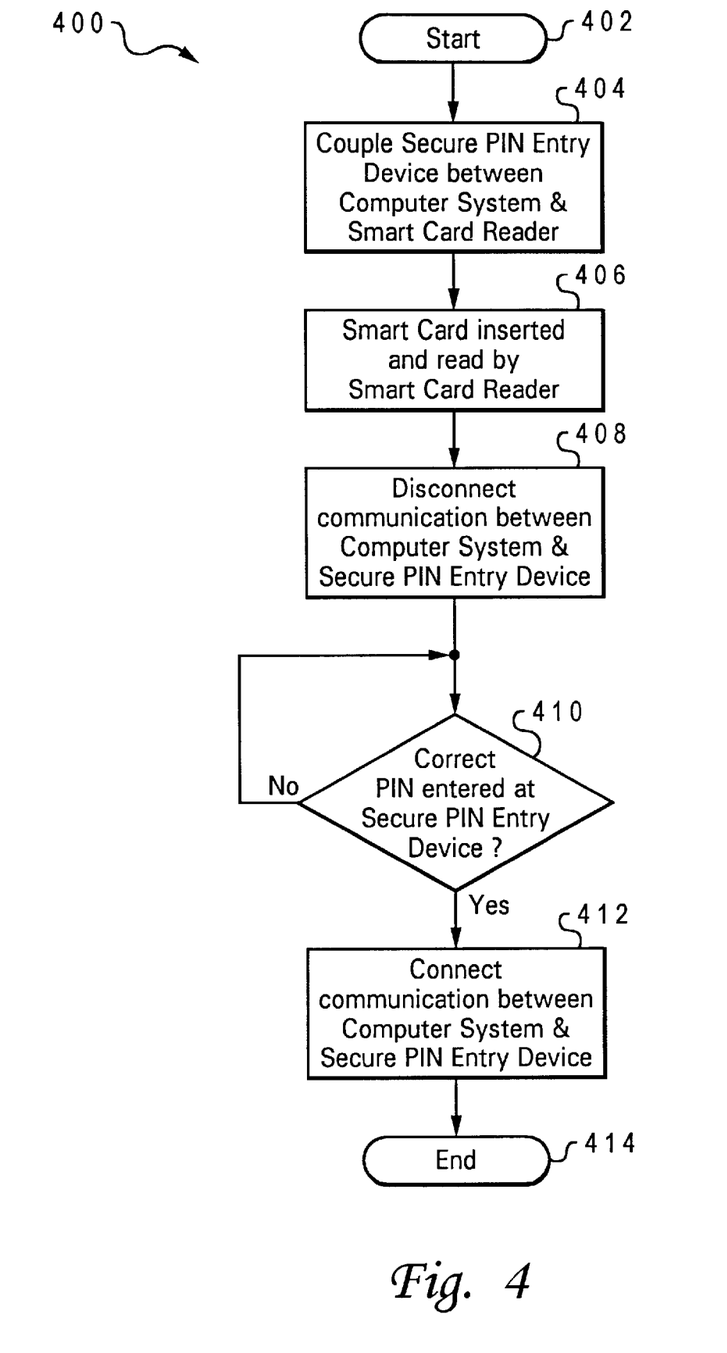
FIG. 4 is a flow chart of an exemplary method for isolating a computer system from entry of a PIN to a smart card.

With reference now to FIG. 4, a flow chart of an exemplary method 400 for hiding from a computer system entry of a PIN to a smart card is shown. Method 400 can be performed by hardware, software, firmware, or in any combination thereof. Method 400 starts at block 402. At block 404, secure PIN entry device 204 is coupled between computer system 202 and smart card reader 208. At block 406, smart card 212 is inserted into and read by smart card reader 208. Method 400 moves to block 408, which shows that a microprocessor within secure PIN entry device 204 disconnects communication between computer system 208 and secure PIN entry device 204. Method 400 then moves to decision block 410, which depicts a determination being made as to whether the correct PIN has been entered at secure PIN entry device 204 for smart card 212. If, at decision block 410, the correct PIN has not been entered, then the communication is maintained as disconnected until the correct PIN has been entered. Method 400 reflects the disconnection by returning before decision block 410 and continuing therefrom. On the other hand, if, at decision block 410, the correct PIN has been entered, then the microprocessor within secure PIN entry device 204 connects the communication between computer system 202 and secure PIN entry device 204 at block 412. Method 400 ends at block 414.

The present invention is not in any limited to the specific hardware or configurations disclosed herein, and any suitable hardware or configuration may be used to implement the present invention. For example, the present invention is not limited to isolating a computer system from specifically a numeric authorization (i.e., PIN), but the present invention may isolate a computer system from any other type of authorization that has a digital input that may not be numeric, such as a retinal thumb print scan.

While the invention has been particularly shown and described with reference to a preferred embodiment, it will be understood by those skilled in the art that various changes in form and detail may be made therein without departing from the spirit and scope of the invention.

What is claimed is:

1. A method of isolating a computer system, from entry of a personal identification number (PIN) to a payment card comprising:

coupling a secure personal-identification-number (PIN) entry device between the computer system and a payment card reader;

disconnecting communication between the computer system and the secure PIN entry device until a correct PIN is entered at the secure PIN entry device for a payment card by electronically switching off the secure PIN entry device from the computer system so that the communication between the computer system and the secure PIN entry device does not exist;

simulating an activation of the secure PIN entry device wherein the simulated activation is sent to the computer system when the secure PIN entry device is electronically switched off; and in response to the correct PIN being entered, connecting the communication between the computer system and the secure PIN entry device.

2. The method according to claim 1 wherein the payment card reader is a smart card reader and the payment card is a smart card.

3. The method according to claim 2, further comprising:

sending the correct PIN to the smart card;

in response to the correct PIN being sent to the smart card, generating an authorizing signal from the smart card, sending the authorizing signal to the secure PIN entry device.

4. The method according to claim 3, further comprising:

in response to the authorizing signal being received by the secure PIN entry device, connecting the communication between the computer system and the secure PIN entry device, and sending the authorizing signal from the secure PIN entry device to the computer system.

5. The method according to claim 1, wherein the connecting step further comprises:

electronically switching on the communication between the computer system and the secure PIN entry device.

6. The method according to claim 1, wherein the secure PIN entry device further comprises a microprocessor for controlling disconnection and connection of the communication between the computer system and the secure PIN entry device.

7. The method according to claim 1, wherein the secure PIN entry device further comprises a display and wherein the method further comprises:

displaying a message request relating to a purchase transaction on the display wherein the message request prompts a user to provide the correct PIN to use the payment card for authorizing the purchase transaction.

8. A system for isolating a computer system from entry of a personal identification number (PIN) to a payment card comprising:

a computer system that is able to be in communication with an unsecure network to allow a user to engage in a purchase transaction;

a payment card reader in which a payment card is inserted and read;

a secure personal-identification-number (PIN) entry device coupled between the computer system and the payment card reader wherein the secure PIN entry device is used for entering a correct PIN;

wherein communication between the computer system and the secure PIN entry device is disconnected until the correct PIN is entered at the secure PIN entry device for the payment card; and wherein, in response to the correct PIN being entered, the communication between the computer system and the secure PIN entry device is connected.

9. The system according to claim 8, wherein the payment card reader is a smart card reader and the payment card is a smart card.

10. The system according to claim 9, wherein:

the correct PIN is sent to the smart card;

in response to the correct PIN being sent to the smart card, an authorizing signal is generated from the smart card and sent to the secure PIN entry device.

11. The system according to claim 10, wherein:

in response to the authorizing signal being received by the secure PIN entry device, the communication between the computer system and the secure PIN entry device is connected, and the authorizing signal is sent from the secure PIN entry device to the computer system.

12. The system according to claim 8, wherein the disconnecting of the communication is achieved by the secure PIN entry device electronically switching off the secure PIN entry device from the computer system so that the communication a between the computer system and the secure PIN entry device does not exist.

13. The system according to claim 12, wherein the secure PIN entry device simulates an activation of the secure PIN entry device wherein the simulated activation is sent to the computer system when the secure PIN entry device is electronically switched off.

14. The system according to claim 8, wherein the connecting of the communication is achieved by the secure PIN entry device electronically switching on the communication between the computer system and the secure PIN entry device.

15. The system according to claim 8, wherein the secure PIN entry device further comprises a microprocessor for controlling disconnection and connection of the communication between the computer system and the secure PIN entry device.

16. The system according to claim 8, wherein the secure PIN entry device further comprises a display for displaying a message request relating to a purchase transaction wherein the message request prompts a user to provide the correct PIN to use the payment card for authorizing the purchase transaction.

17. A program product for isolating a computer system from entry of a personal identification number (PIN) to a payment card comprising:

instruction means for receiving a correct PIN for a payment card;

instruction means for preventing communication to a computer system until the correct PIN is received by electronically switching off the secure PIN entry device from the computer system so that the communication between the computer system and the secure PIN entry device does not exist;

instruction means for simulating an activation of the secure PIN entry device wherein the simulated activation is sent to the computer system when the secure PIN entry device is electronically switched off;

in response to the correct PIN being entered, instruction means for connecting the communication to the computer system; and computer usable media bearing said instruction means.

18. The program product according to claim 17, wherein the payment card is a smart card.

19. The program product according to claim 18, further comprising:

instruction means for sending the correct PIN to the smart card;

in response to the correct PIN being sent to the smart card, instruction means for receiving a generated authorizing signal from the smart card.

20. The program product according to claim 19, further comprising:

in response to the authorizing signal being received, instruction means for connecting the communication to the computer system, and instruction means for sending the authorizing signal to the computer system.

* * * * *